United States Patent Office
3,726,646
Patented Apr. 10, 1973

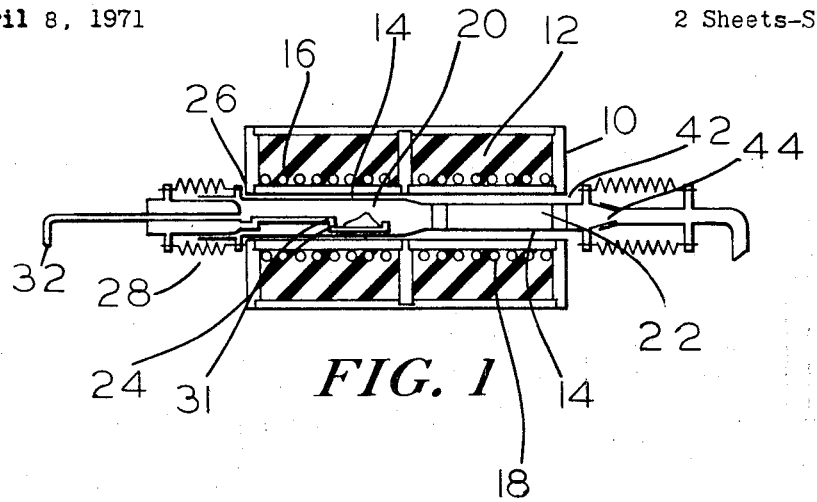
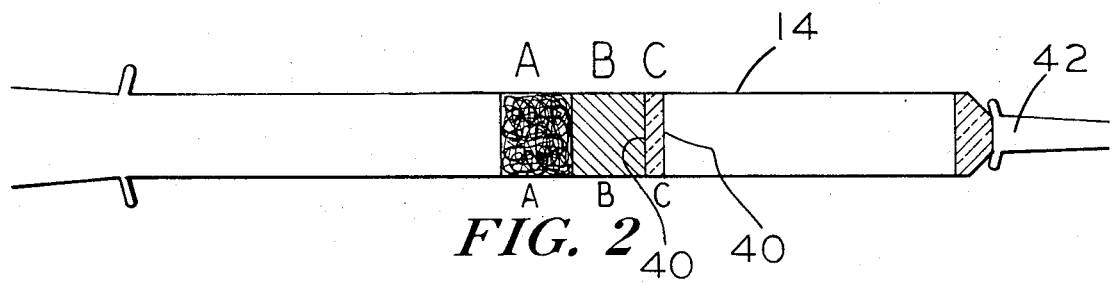
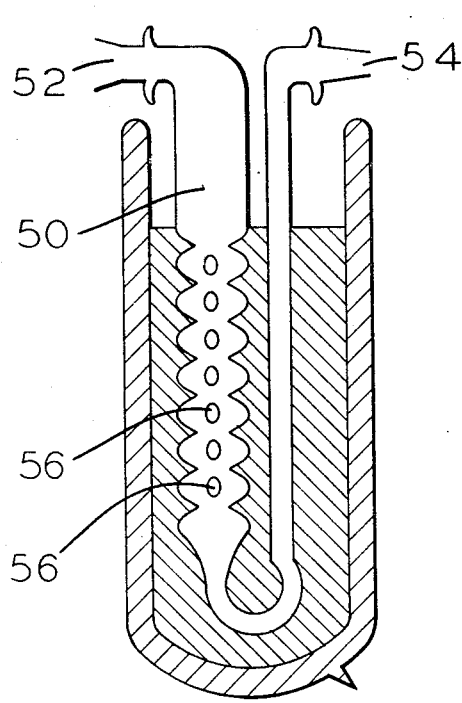
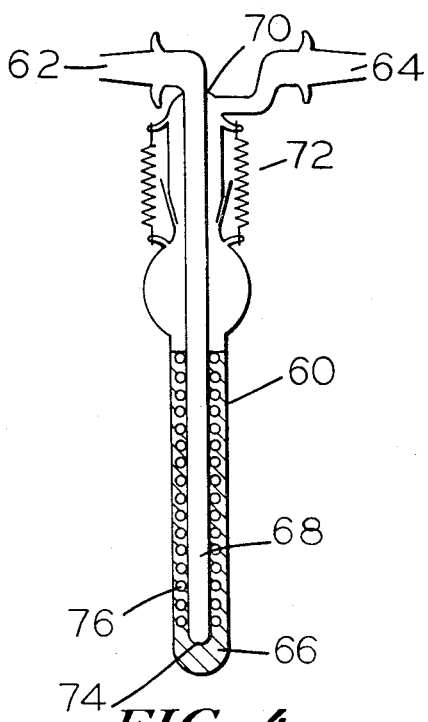

3,726,646
APPARATUS TO OXIDIZE BIOLOGICAL MATERIAL
Michael A. Kravetz, North Brunswick, and Eric C. Schreiber, Locust, N.J., assignors to R. J. Harvey Instrument Corporation, Hillsdale, N.J.
Filed Apr. 8, 1971, Ser. No. 132,329
Int. Cl. G01n 31/10, 33/16
U.S. Cl. 23—253 PC    4 Claims

ABSTRACT OF THE DISCLOSURE

Furnace for the oxidation of biological material and novel scintillation solutions. By utilizing the furnace and the improved combustion tube packing of this invention biological material is converted to carbon-14 dioxide and triated water for purposes of liquid scintillation counting.

BACKGROUND OF INVENTION

The most common instrument now being employed for the determination of carbon-14 and tritium is the liquid scintillation counter. With this apparatus a large variety of organic compounds can be counted easily with little chemical preparation and with precision, due to the absence of self-absorption. However, the liquid scintillation method requires that the samples measured be capable of dissolving in a few selected organic solvents, have no color, and do not exhibit the property of interfering with the photons generated in the solution by the radioactive decay, which would result in quenching of the scintillation process.

Many untreated biological substances cannot be directly measured in the liquid scintillation counter. In order to permit the determination of carbon-14 in these materials, several research groups have developed methods involving the conversion of the sample to carbon-14 dioxide and the subsequent reaction of this gas with an organic amine to form a non-volatile product that is soluble in a liquid scintillation cocktail. The initial conversion is usually carried out by a combustion flask procedure. The tritium determination is done in very much the same manner as the carbon-14 determination except in this instance the sample is converted to tritiated water which is dissolved in a suitable liquid scintillation cocktail. The initial conversion is again carried out by a combustion flask procedure but in this case the tritiated water is in the vapor phase and must be condensed to the liquid state before it can be dissolved in the cocktail. These methods give usable results. However, each system has limitations unacceptable to the investigations being carried out.

Instruments which are utilized to convert carbon to carbon dioxide have been discussed in the literature, "Determination of Carbon-14 and Tritium in Blood and Other Biological Materials," M. A. Tamers and M. Diez, International Journal of Applied Radiation and Isotopes, vol. 15, pp. 697–702 (1964), discusses the method of converting carbon-14 to carbon-14 dioxide to conduct liquid scintillation measurements. Another reference to a similar type of apparatus is found in "Tritium Assay by Combustion With a Novel Oxygen Train and Liquid Scintillation Techniques," H. W. Knoche and Robert M. Bell, Analytical Biochemistry, vol. 12, pp. 49–59 (1965). More recently a "combustion train," a term utilized for these biological analyzers, was described in "A Furnace for Combustion of Biological Material Containing Tritium and Carbon-14 Labeled Compounds," M. H. Griffiths and A. Mallinson, Analytical Biochemistry, vol. 22, pp. 465–473 (1968). Each of these "trains" have both good and bad features depending upon the use made thereof in a scientfic laboratory. However, the instruments and methods utilized to date have never been able to be commercialized because of their erratic behavior and difficulties in manipulation.

SUMMARY OF INVENTION

It has been discovered that a commercially feasible "combustion train" apparatus can be made which gives reliable results, thus eliminating the selectivity previously required. The instrument of this invention comprises a housing, a fused quartz tube passing through said housing, electrical heating elements surrounding said tubing, means for carrying samples of biological material for placement within said tubing, and a catalytic area opposite said carrying means comprising a catalyst system containing one material selected from each of the following three groups individually or in combination: (a) platinum, palladium or nickel gauze; (b) silver vanadate, silver tungstate, magnesium oxide, or tungsten trioxide; and (c) aluminum oxide, chromic oxide, cupric oxide, cobaltic oxide. It has been found by utilizing a combination of catalysts within the tubing, more accurately reliable and reproducible measurements of carbon-14 and tritium can be accomplished.

DESCRIPTION OF FIGURES

FIG. 1 is a cutaway perspective overall view of the apparatus;

FIG. 2 is a side elevation view of the fused quartz furnace tube;

FIG. 3 is an illustrative cutaway view of the tritium trap;

FIG. 4 is an illustrative cutway view of the carbon-14 dioxide trap; and

DESCRIPTION OF INVENTION

Figure 5:
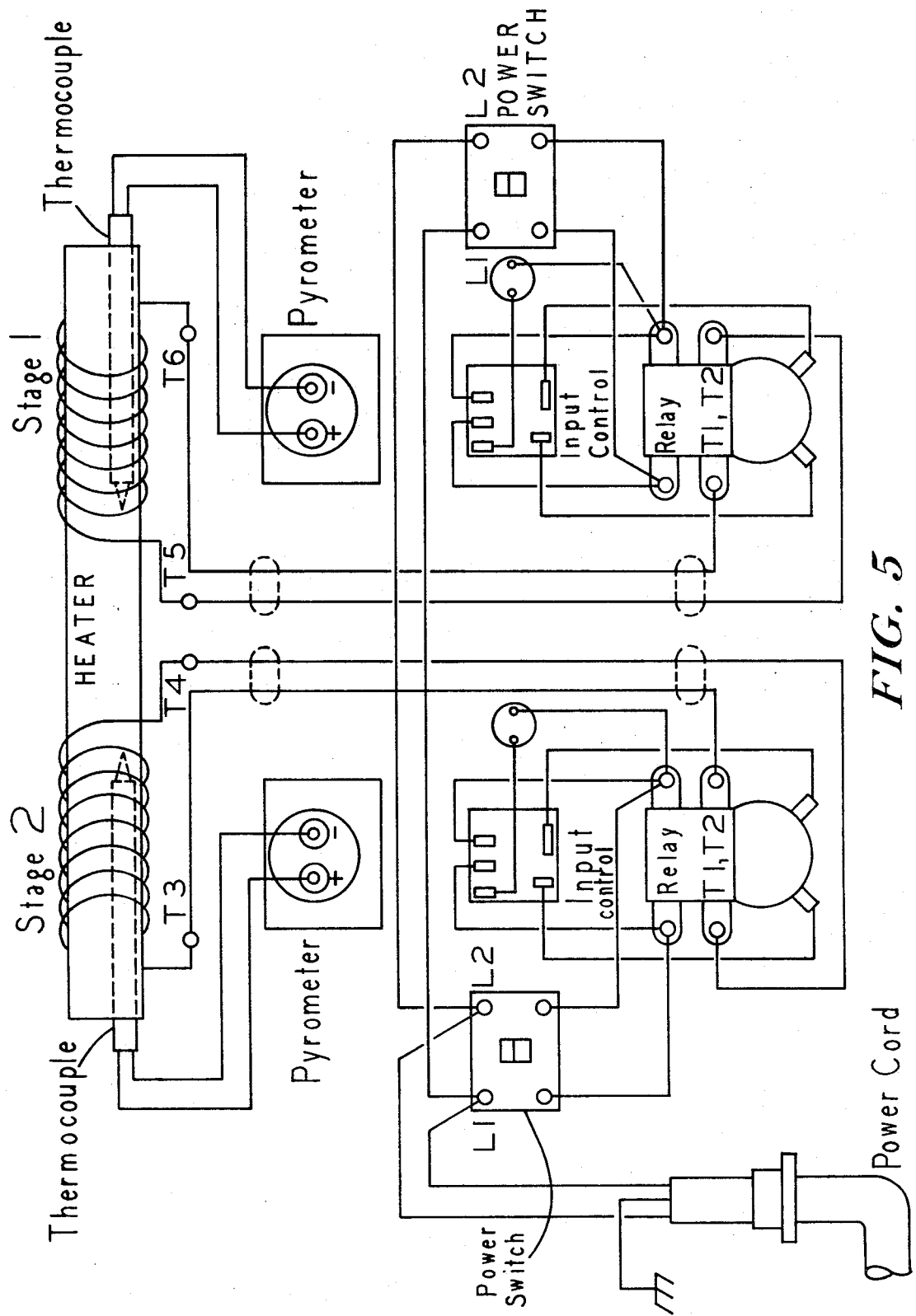
FIG. 5 is a schematic view of the electrical circuits of the instant invention.

Referring to FIGS. 1 to 4, housing 10 contains therein insulation material 12 and fused quartz furnace tube 14. Circumscribing silica tubing 14 are electrical heating elements 16 and 18 attached to power source illustrated in FIG. 4.

Fused quartz tubing 14 is divided into two zones, sample zone 20 and catalytic zone 22. Within sample zone 20 is sample holder 24 which is illustrated in FIG. 2 and is maintained in housing 10 at portal 26 by friction seal and springs 28. Fused quartz tubing 14 has portal 30 in the sample zone 20 to allow for the passage of oxygen over the sample. Sample holder 24 has a removable fused quartz sample "boat" 31 contained therein to adequately hold the sample.

Catalytic zone 22 of fused quartz tube 14 has three regions over which the gaseous combustion products from sample zone 20 pass to be converted to carbon-14 dioxide and tritium.

The catalysts utilized, as illustrated in FIG. 2 are placed in proximate relationship as the products flow from the sample to allow the gaseous products to be converted to carbon dioxide and water. The products first flow over a catalyst from zone A of gauze 32, thereafter through zone B34, a catalyst selected from the group consisting of silver vanadate, magnesium oxide and tungstanic oxide, silver oxide, and then over copper oxide 36 catalyst in zone C. Quartz wool 40 or other separating material can separate and delineate zone C.

Exit portal 42 in housing 10 has extending therefrom the exit orifice 44 of the fused quartz tube 14 in a manner whereby collecting vials can be attached.

As the present invention relates to the scintillation counting of carbon-14 and tritium, the appropriate collection tubes may be attached at 42. When triated water is to be collected, the collection tube illustrated in FIG.

3 is utilized and similarly when carbon-14 dioxide is to be collected, the tube illustrated in FIG. 4 is utilized. Tritium collection tube 50 comprises inlet 52 and outlet 54. The inlet 52 is designed to fit tightly over outlet orifice 44. The tube 50 has Vigreux-column type indentations 56.

Carbon-14 dioxide trap 60 (FIG. 4) is utilized to collect the carbon-14 dioxide which flows from the fused quartz tube 14 comprises inlet 62 and outlet 64, both with a standard taper joint to provide a form fit to the delivery tube. This carbon-14 dioxide tube 60 comprises a receiving tube 66 and delivery tube therein 68. Delivery tube 68 is inserted into receiving tube 66 at joint 70 and held fastened therein by springs 72. Delivery tube 68 has orifice 74 at its end to allow carbon-14 dioxide to pass out of the delivery tube and a helical glass rod 76 around its outside to allow the carbon-14 dioxide gas to bubble through the solution in a long pathway.

The scintillation solutions utilized (also known as "Scintillation Cocktails") for carbon-14 dioxide forms an important part of this invention and is also a contributing factor to the high accuracy of the apparatus. Carbon-14 dioxide is collected in trap 60 in a solvent solution comprising a major proportion (from about 30 to 40%) of a water compatible solvent such as lower alkyl alcohol (e.g. methanol, ethanol, hexanol) or an ether such 2-methoxyethanol or 2-ethoxyethanol and a minor proportion (of from about 20 to 29%) of a basic organic amine such as 2-phenethylamine, $\beta$-aminoethanol, n-hexylamine, cyclohexylamine, Hyamine®, triethylamine or trimethylamine and a non-polar solvent such as toluene or dioxane, having therein from about 0.3 to 1.0% of a primary phosphor and from about 0.005 to 0.1% of a secondary phosphor. The most preferred primary phosphor is 2,5-diphenyloxazole. Other phosphors are:

Primary phosphors 2-phenyl-5-(4-biphenylyl)-1,3,4-oxadiazole;
2-(4-tert-butylphenyl-5-(4-biphenylyl)-1,3,4-oxadiazole; and
p-Terphenyl.

However, other phosphors can also be effectively utilized. 1,4-bis-2-(4-methyl-5-phenyloxazolyl)benzene is the most preferred secondary phosphor but examples of other secondary phosphors that may be utilized are:

Secondary phosphors 1,4-bis-2-(5-phenyloxazolyl)-benzene;
Naphthalene;
p-Bis(o-methylstyryl)-benzene; and
1,4-bis-2-(5-$\alpha$-naphthyloxazolyl)-benzene.

Satisfactory results have been accomplished in measuring tritium by utilizing Bray's Scintillation Fluid which is disclosed and taught in the Anal. Biochem., 1, 279 (1960).

As mentioned above the scintillation trains disclosed in the past did not yield accurate and precise results or required frequent change of catalyst when utilized in commercial operations. The utilization of the instant combination of catalysts has brought commercial success to this product as the heat applied to copper oxide in the past destroyed this catalyst. In catalyst zone A wherein platinum gauze is inducted in the preferred embodiment, it is to be understood that nickel gauze or palladium gauze may also be utilized and yield the desired results.

In zone C cobalt oxide pellets (also referred to as cobalt oxide) has been found to be a satisfactory replacement for copper oxide and quartz wool 40 can be replaced with platinum gauze. The above substitutions can be effected without changing the operation of the apparatus.

In operation, a biological sample of blood, tissue homogenate, sample or fecal homogenate is placed in sample boat 31 of sample holder 24 which is placed into sample zone 20. Heat is then applied to the zone to combust the sample. The amount and manner of applying heat is seen in FIG. 5. Combustion of the sample is carried out at temperatures of from about 800° to about 900° centigrade. The gaseous products are then swept along in an atmosphere of oxygen to catalyst zone 22 which is maintained at a temperature of from about 650° to 700° centigrade. Complete combustion, conversion and collection of sample takes about 4 minutes. After this time period the scintillation solution is removed transferred to a counting vial, placed in a liquid scintillation counter such as a Packard® Model 3380 and the results recorded.

This operation can be carried out in tandem or individually. For example, the tritium collection vial 60 can be placed at outlet 44 and then the carbon-14 dioxide absorber placed at tritium outlet 54. Thus for a duel label containing carbon-14 and tritium sample both the carbon-14 dioxide and tritiated water can be counted.

It has been found that the amount of catalyst necessary to give satisfactory and reproducible results can vary. Thus from about 6 to 8 inches of copper oxide catalytic material, or the like, in zone A can be utilized. Similarly, from about ½ to 1½ inches catalytic material of silver vanadate in zone B and about 1 to 3 inches of catalytic material can be utilized in zone C.

Example

Utilizing the apparatus of this invention nine samples each of mannitol (200 mg.) whole blood (0.5 ml.) or feces homogenate (400–600 mg.) were combusted. The carbon-14 samples contained from approximately 100 to 8200 d.p.m. (disintegrations per minute) and the tritium samples contained 300 to 3,000 d.p.m. Each figure represents the results of eighteen measurements expressed in Percent of Radioactivity Recovered with its standard error, and are as follows:

| | Percent radioactivity recovered | |
|---|---|---|
| | 14c | 3H |
| Mannitol (200 mg.) | 101±2.6 | 99±1.2 |
| Whole blood (0.5 ml.) | 100±2.0 | 99±1.8 |
| Feces homogenate (400–600 mg.) | 101±2.6 | 96±2.1 |

Replication is excellent. Eight pairs of whole blood samples (containing from 300 to 10,000 d.p.m. of carbon-14 activity in 0.5 ml.) when combusted, showed a range of absolute difference of 0.1–3.9% in recovery between duplicates. Similarly ten pairs of whole blood samples (containing from 1,000 to 150,000 d.p.m. of tritium activity in 0.5 ml.) when combusted, showed a range of absolute difference of 0.1–2.7% between duplicates.

In trapping the tritium in collector 70, an ice bath should be utilized so as to maintain a temperature of approximately −90°. This can be accomplished by a mixture of methanol and Dry Ice or acetone and Dry Ice, or any of a number of organic "slush" baths.

We claim:

1. An apparatus to oxidize biological material to carbon-14 dioxide and triated water which comprises a housing, a tube passing through said housing, electrical heating means surrounding said tube, means for carrying samples of biological material positioned within said tube which are decomposed to gas by heating the tube, and a catalytic area within said tube over which the gases are carried, said gases passing over the catalytic zone so as to contact the following catalysts in order:

(a) platinum, palladium or nickel gauze;
   (b) silver vanadate, silver tungstate, magnesium oxide or tungsten trioxide; and
   (c) aluminum oxide, chromic oxide, cupric oxide, or cobaltic oxide.

2. An apparatus in accordance with claim 1 wherein the catalysts in each tandem position are selected from the group consisting of platinum, silver vanadate and cupric oxide respectively.

3. The apparatus in accordance with claim 2 wherein the tube contains from about 6–8 inches of cupric oxide, about ½ to 1½ inches of silver vanadate and from about 1–3 inches of platinum.

4. An apparatus in accordance with claim 3 wherein said carbon-14 dioxide is absorbed in a scintillation cocktail having in a non-polar solvent a major proportion of a water compatible solvent, a minor proportion of a basic organic amine solvent selected from the group consisting of 2-phenethylamine, $\beta$-aminoethanol, n-hexylamine, cyclohexylamine, Hyamine®, triethylamine, trimethylamine in combination with a primary phosphor and a secondary phosphor.

References Cited

UNITED STATES PATENTS

| 3,226,197 | 12/1965 | Lewis | 23—253 PC |
| 3,346,342 | 10/1967 | Miller | 23—253 PC |
| 3,560,158 | 2/1971 | Benson | 23—230 |

MORRIS O. WOLK, Primary Examiner

R. E. SERWIN, Assistant Examiner

U.S. Cl. X.R.

23—230 PC, 230 B; 252—408